May 16, 1967 — O. W. APPLETON — 3,319,504
SLANTED FINGER BOARD FOR STRINGED INSTRUMENTS
Filed Oct. 6, 1966
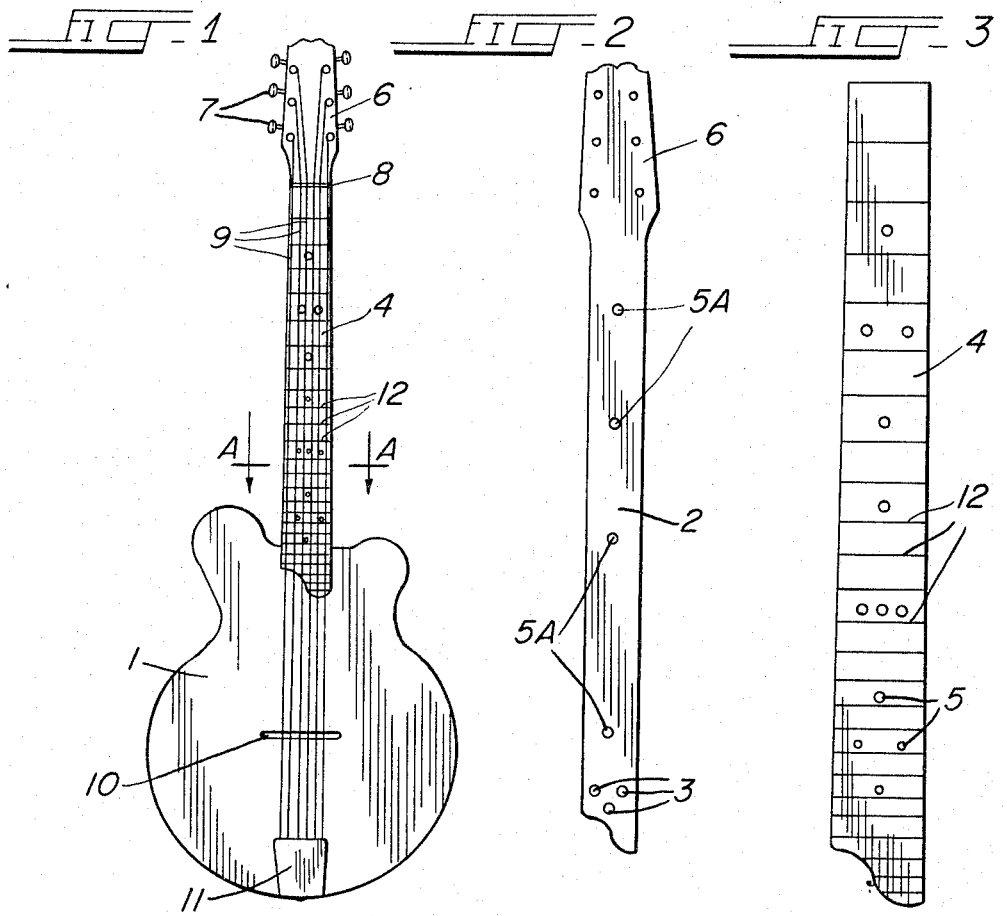
INVENTOR.
O. W. APPLETON 3,319,504
SLANTED FINGER BOARD FOR STRINGED
INSTRUMENTS
Orbra W. Appleton, 614 S. 12th St.,
Burlington, Iowa 52601
Filed Oct. 6, 1966, Ser. No. 584,778
3 Claims. (Cl. 84—314)

This invention pertains to stringed instruments which are primarily used to play chords, and more particularly to a slanted finger board for use thereon.

Heretofore in the manufacture of stringed instruments the finger board, which is placed on the neck of the instrument, has been parallel with and generally in the same plane as the body of the instrument. In playing many stringed instruments the first and second fingers are used to bar across the finger board from the treble to the bass strings to produce chords. A tight bar must be held to prevent a buzzing sound which occurs when the strings are held loosely against the frets of the instrument. It has always been a problem with performers and players of stringed instruments to obtain tight bar positions, especially when the fingers are weak.

It is, therefore, an object of this invention to provide a stringed instrument with a slanted finger board making it possible to hold tight barred positions in the chording of the instrument.

It is a further object of this invention to provide a stringed instrument with a finger board that fits the contour of the hand when chords are played with the instrument.

It is a further object of this invention to provide a stringed instrument with a finger board that allows greater ease of playing.

Further objects and advantages of this invention will become apparent from the following drawings, descriptions, and claims.

FIGURE 1 is a plan view of a Spanish guitar having six strings.

FIGURE 2 is a plan view of the neck of the guitar without the finger board attached thereto.

FIGURE 3 is a plan view of the finger board of the guitar.

FIGURE 4 is a sectional view of the neck and finger board taken on line A—A of FIGURE 1.

FIGURE 5 shows a modification of the construction of the neck and finger board of the instrument.

FIGURE 6 shows a further modification of the construction of the neck and finger board of the instrument.

FIGURE 7 is a pictorial representation of a hand showing the fingers in position to bar a chord across the finger board.

Referring now to the drawings, the guitar shown in FIGURE 1 is comprised of a body 1 to which a neck 2 is attached by means of screws (not shown) which protrude through the holes 3 in the neck 2. The finger board 4 is laminated to the neck 2 and also held fast to the neck 2 by screws (not shown) which protrude through holes under some of the position dots 5 and engage threaded holes 5A in the neck 2. The guitar has a peg head 6 with tuning pegs 7 located therein. Nut 8 is located on the neck 2 near the peg head 6. Strings 9 are strung between the peg head 6 and over the nut 8 and the bridge 10 being held to the body 1 by the tail piece 11. Frets 12 are located on the finger board 4. The nut 8 and the bridge 10 slant in the same direction as the finger board 4 shown in FIGURE 4 so that the strings 9 are approximately the same distance above a given fret 12 on the finger board 4. This can be seen by reference to FIGURE 4. As in all stringed instruments, the distance between the strings 9 and each fret 12 is slightly greater on each fret 12 approaching the bridge 10.

As can be seen in FIGURES 4 and 7, the thickness D of the larger side of the finger board 4 accommodates the distance D' on the inside of the hand between the metacarpophalangeal joints 13 and the proximal interphalangeal joints 14 of the fingers. This together with the thickness d of the smaller side of the finger board 4 then allows the portion of the fingers between the proximal interphalangeal joints 14 and the tips 15 to bar across the finger board 4 in a plane parallel with the plane of the finger board 4. This allows tight barring of the finger board 4 and also gives the much desired effect of being able to bar a chord with the fingers and to hold certain chords with the tips 15 of the fingers without rotating the hand on the neck 2 of the guitar when changing between chords requiring different positions of the fingers.

With the finger board 4 slanted as shown in the drawings the performer can also see the finger board 4 more easily than if the finger board 4 were parallel with the plane of the body 1 of the guitar.

It is to be further noted that merely rotating a conventional neck and finger board to form a plane which is at an angle with the body of a guitar will not give the desired effect in that the distance D' between the metacarpophalangeal joints 13 and the proximal interphalangeal joints 14 of the fingers will not be accommodated.

FIGURE 5 shows a modification of the invention whereby a conventional finger board 16 is fastened to a wedge 17 and in turn the wedge 17 is fastened to a neck 18 which has the same shape as the neck 2. FIGURE 6 shows a conventional finger board 19 fastened to a neck 20 shaped to give the necessary thickness on the treble side of the instrument. Both of these modifications produce the same desired effect.

In less expensive guitars the finger board 19, as shown in FIGURE 6, would be eliminated and the frets 12 would be placed directly on the neck 20. It is to be understood that the elimination of the finger board 19 does not change the invention.

I claim:

1. A stringed musical instrument comprised of a body and a neck, strings ranging from treble to bass supported between the body and the neck, a finger board with frets on its playing surface, the finger board located on the neck under the strings, the playing surface of the finger board being slanted in combination with the neck so that it is thicker under the treble strings than under the bass strings, the strings being supported so as to be approximately the same distance above a given fret on the finger board.

2. The stringed musical instrument of claim 1 in which the thickness of the finger board in combination with the neck under the treble strings is such as to accommodate the distance between the metacarpophalangeal joints and the proximal interphalangeal joints of the fingers on the inside of the fingering hand for the instrument.

3. The stringed musical instrument of claim 2 in which the slant of the playing surface of the finger board is such that the portion of the fingers of the fingering hand between the proximal interphalangeal joints and the tips bar across the finger board in a plane parallel with the plane of the finger board when the hand is in the normal playing position which is closed.

References Cited by the Examiner
UNITED STATES PATENTS
2,816,469  12/1957  Gossom _____ 84—293

RICHARD B. WILKINSON, Primary Examiner.
C. M. OVERBEY, Assistant Examiner.